United States Patent [19]

Orpet

[11] Patent Number: 4,556,328
[45] Date of Patent: Dec. 3, 1985

[54] RADIATION PYROMETER SYSTEM

[76] Inventor: Edward G. Orpet, 9 Stour Rd., Oakley, Basingstoke, Hampshire RG23 7AR, England

[21] Appl. No.: 571,267

[22] Filed: Jan. 16, 1984

[30] Foreign Application Priority Data

Jan. 20, 1983 [GB] United Kingdom ............... 8301513

[51] Int. Cl.⁴ .............................................. G01J 5/00
[52] U.S. Cl. .................................... 374/144; 374/128; 356/43
[58] Field of Search ............... 374/121, 124, 128, 144; 356/43; 250/342, 338 R

[56] References Cited

U.S. PATENT DOCUMENTS 3,574,282  4/1971  Curwen .............................. 374/144
3,623,368  11/1971 Decker, Jr. ......................... 374/144
3,668,427  6/1972  Curwen .............................. 307/491

FOREIGN PATENT DOCUMENTS 2119084  4/1982  United Kingdom ............... 374/144
2118715  4/1983  United Kingdom ............... 374/144

OTHER PUBLICATIONS

*Electronics*, vol. 51, No. 1, Jan. 5, 1978, "Infrared Sensor Outclasses Thermocouples in Checking Metal Fatigue in Jet Engines", pp. 54–55.

*Primary Examiner*—Steven L. Stephan
*Assistant Examiner*—W. Morris Worth
*Attorney, Agent, or Firm*—Pollock, Vande Sande and Priddy

[57] ABSTRACT

A pyrometer system for a gas-turbine engine, or the like, has a high-resolution radiation pyrometer that supplies signals to a detector unit. The detector unit includes an inverter that inverts the pyrometer output and supplies these signals via a diode to one electrode of a capacitor. The other electrode of the capacitor is grounded, a resistor being connected across the capacitor so that it is slowly discharged. The charge on the capacitor approximately follows the high-value/low-temperature signals, which are reinverted by a processing unit to give an averaged temperature indication. The diode is short-circuited for periods, approximately equal to the blade rotational frequency. During these periods the charge on the capacitor drops to the instantaneous value of the pyrometer output, producing a low-voltage/high-temperature spike. The detector unit includes a store to which these spikes are supplied after reinversion. The store has a long time period so as to produce a signal which approximately follows the tips of the high-temperature spikes.

8 Claims, 10 Drawing Figures

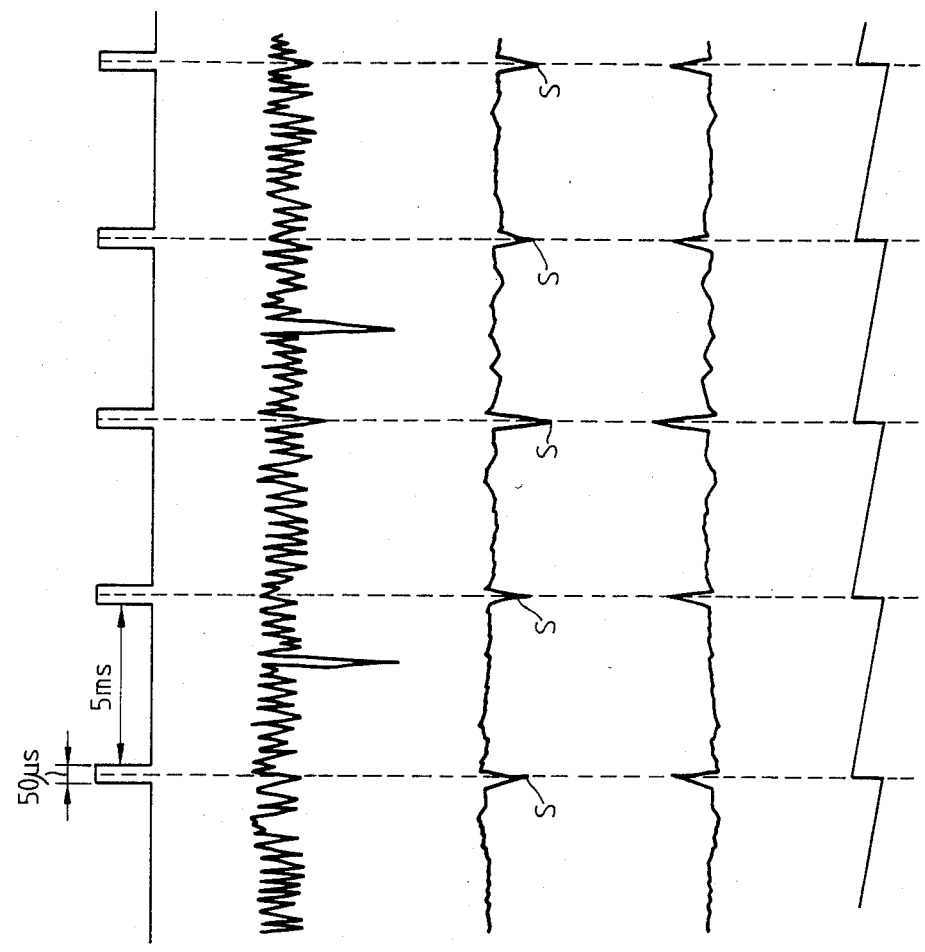

RADIATION PYROMETER SYSTEM

BACKGROUND OF THE INVENTION

This invention relates to radiation pyrometer systems.

The invention is more particularly concerned with pyrometer systems in which the effect of noise is reduced.

Radiation pyrometers used in gas-turbine engines to obtain an indication of the temperature of the turbine blades, can suffer from noise caused by the passage of excessively hot particles, such as carbon particles, and flames in the field of view of the pyrometer. Unless provision is made to compensate or reduce the effect of these anomalies as inaccurate measure of temperature can be given. The high-temperature noise phenomena are generally of a transient nature and their effect can thereby be reduced readily by reducing the speed of response of the pyrometer system. This technique can be useful in reducing noise but has the disadvantage of making the system unable to respond to other transient phenomena, such as the passage in front of the pyrometer of an overheated blade. Another disadvantage of slow-response pyrometers is that transient signals which are unipolar in nature will, in effect, contribute a background signal causing errors in the estimation of mean temperature. Since it can be useful in predicting engine failure to be able to detect the temperature of individual blades, a slow response pyrometer has distinct disadvantages.

BRIEF SUMMARY OF THE INVENTION

It is an object of the present invention to provide a pyrometer system in which the effect of noise can be reduced but without the above-mentioned disadvantages.

According to one aspect of the present invention, there is provided a pyrometer system including a radiation pyrometer and a detection circuit, the detection circuit being arranged to provide a first signal representative substantially of the lowest value output of the pyrometer, and at predetermined times to provide a second signal representative of the actual value output of the pyrometer at those times.

The circuit may include capacitor means that is arranged to be progressively discharged, and inverter means that is arranged to invert the output signal of the pyrometer and to supply the inverted signal to charge the capacitor means such that the charge on the capacitor means thereby provides said first signal. The circuit may include unidirectional current means connected intermediate the inverter means and the capacitor means, the unidirectional current means being connected to allow passage of positive-going signals to the capacitor means.

According to another aspect of the present invention, there is provided a pyrometer system including a radiation pyrometer and a detection circuit, the detection circuit including inverter means that is arranged to invert the output signal of the pyrometer, capacitor means that is arranged to receive the inverted signal via unidirectional current means such that the charge on the capacitor means follows substantially a low-temperature signal from the pyrometer, and means for short-circuiting the unidirectional current means at predetermined times such that the charge on the capacitor follows the actual value output of the pyrometer, the charge on the capacitor being supplied as a first signal when connected via the unidirectional current means, and as a second signal at said predetermined times.

The circuit may include switching means connected across the unidirectional current means, and the switching means may be closed to short-circuit the unidirectional current means at the predetermined times to provide said second signal. The circuit may include oscillator means that is arranged to control operation of said switching means. Where the pyrometer system is used to monitor the blades of a gas-turbine engine, the discharge time period of the capacitor means may be substantially longer that the interval between passage of adjacent blades in the field of view of the pyrometer. The predetermined times at which said second signals are produced may occur at approximately the rotational frequency of the turbine blades, although the times may slightly differ from the rotational frequency such that said second signals are produced in respect of different blades each revolution. The second signal may be supplied to a store that is progressively discharged over a time period greater than the intervals between the predetermined times, such that the output of the store is substantially representative of peak temperature. The unidirectional current means may be short-circuited for intervals substantially equal to the time of passage of an individual blade in the field of view of the pyrometer.

A pyrometer system, according to the present invention, for use on a gas-turbine engine will now be described, by way of example, with reference to the accompanying drawings.

BRIEF DESCRIPTION OF THE DRAWINGS

FIGS. 6A to 6E illustrate an alternative set of signals produced by the pyrometer system.

DETAILED DESCRIPTION

Figure 1:
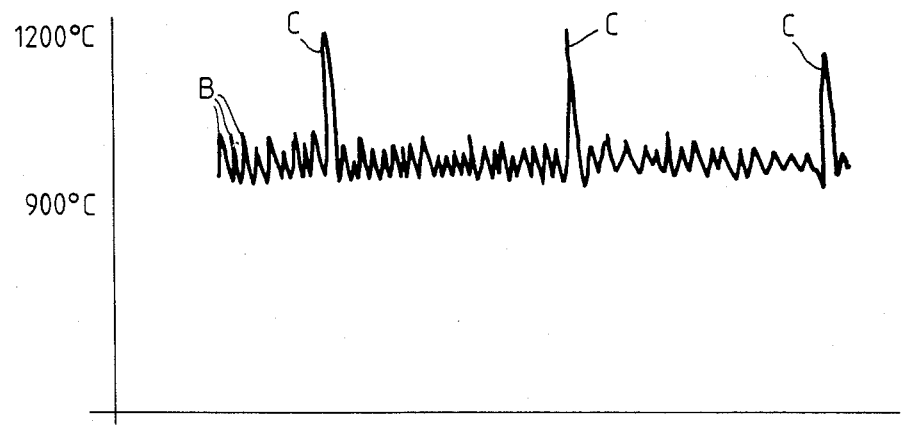
FIG. 1 shows schematically a typical output signal from a pyrometer.

With reference to FIG. 1, there is shown schematically a typical output from a pyrometer viewing the blades of a gas-turbine engine. Each time the hottest part of a blade passes in front of the pyrometer, the radiation level, and hence the temperature sensed by the pyrometer, rises. This produces a pulsed output from the pyrometer at a frequency of about 20–25 kHz, depending on the number of blades and the speed of the engine. The pulses B therefore rise to the maximum temperature, of the hottest part of the blade, and fall to the lowest temperature, of the coolest part of the blade, the difference between these two temperatures being typically about 100° C., and the temperature of the blades being around 900° C. In general, the pyrometer will only view a selected part of the turbine blades so its output is dependent only on the temperature of that restricted region within its field of view.

Passage of an incandescent carbon particle produces a large-amplitude pulse C which may rise to about 1200° C. and be of a duration between 10 $\mu$s and 10 ms. The frequency of these pulses is much less than that produced by the blades themselves so they could easily be suppressed by averaging the pyrometer output, such as by use of a slow-response pyrometer. It will be appreciated, however, that such a technique would not enable the detection of an individual, excessively hot blade.

Interference or noise can also be caused, especially during start-up of the engine, by the passage of flames in front of the pyrometer; this produces high-temperature pulses of longer duration.

Figure 2:
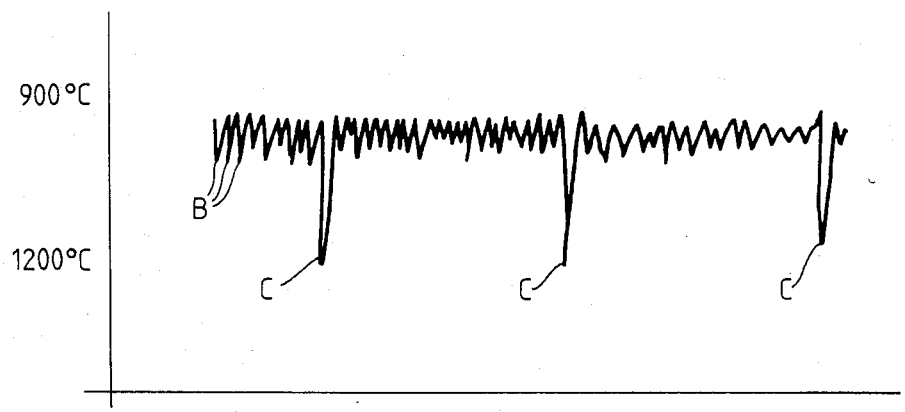
FIG. 2 shows the output signal after inversion by the pyrometer system.
Figure 3:
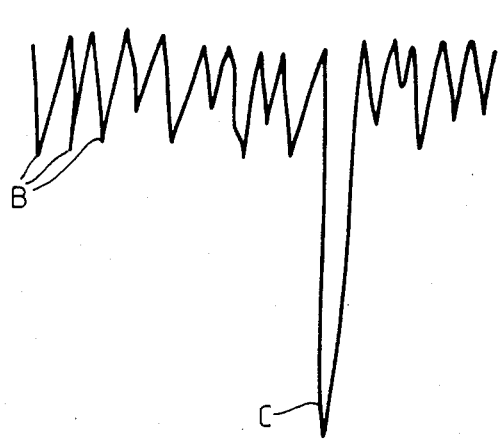
FIG. 3 shows the inverted signal of FIG. 2 to a larger scale.

In the present invention, the output of the pyrometer is first inverted by the system in the manner shown in FIG. 2, so that the high temperature pulses C are of a lower value than the normal blade pulses B. A part of the plot of FIG. 2 is shown to a larger scale in FIG. 3.

The principle of the present invention is to allow the now high-amplitude/low-temperature pulses to charge a capacitor which is allowed to discharge at a selected rate. The output of the capacitor is shown as the bold line in FIG. 4 which is superimposed on the inverted output. It can be seen that the high-amplitude parts of the pulse fully charge the capacitor and that, when the pulse reverts to a lower amplitude, the capacitor follows this at a rate which ensures that it is not decreased in amplitude significantly before the next positive-going/high-amplitude/low-temperature pulse. The voltage across the capacitor is therefore substantially constant and equal to the high-amplitude parts of the inverted output. On occurrence of a high-temperature/low-amplitude pulse C such as is caused by incandescent carbon particles, the capacitor behaves in the same way and its stored value does not drop significantly before the next positive-going pulse occurs.

Figure 5:
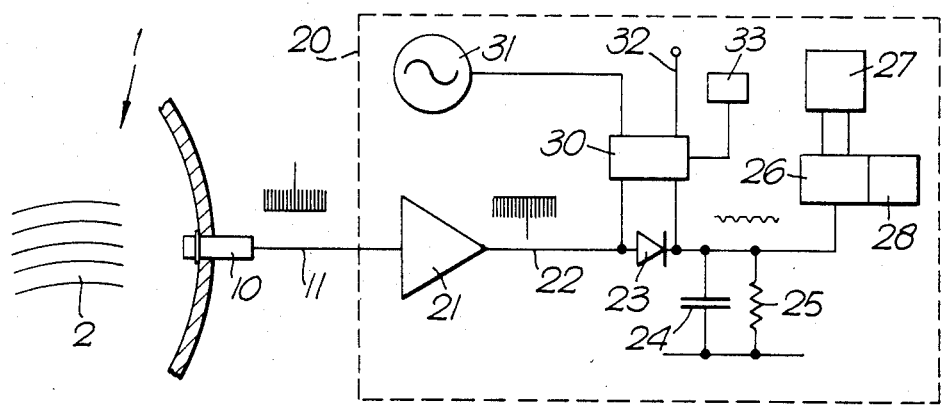
FIG. 5 shows schematically the pyrometer system.

The pyrometer system by which this is achieved will now be described with reference to FIG. 5. The system is installed with a gas-turbine engine, indicated generally by the numeral 1, and has a conventional high-resolution radiation pyrometer 10 mounted to view the turbine blades 2 as they pass in front of the pyrometer. The output of the pyrometer 10 is of the form shown in FIG. 1 and this is supplied via a cable 11 to a detector unit 20. The cable 11 may be an electrical cable or a fiber-optic cable. Within the detector unit 20 an inverter/amplifier 21 receives the signals from the pyrometer, although if the signals are in optical form they will be converted first to analog electrical signals. The inverter 21 produces output signals on line 22, which are of the kind shown in FIGS. 2 and 3, and these are supplied to the anode of a diode 23 or other unidirectional current device. Signals passed by the diode 23 are applied to one electrode of a capacitor 24, the other electrode of which is connected to ground. A resistor 25 is connected in parallel across the capacitor to ground. The junction of the capacitor 24 and the resistor 25 is connected via a processing unit 26 to a display unit 27 which displays the blade temperature as an averaged value or as a peak value. It will be appreciated that the output could instead be supplied to other utilization means for use in control of the engine, data recording or other purposes.

A CMOS switching unit 30 is connected across the diode 23 and, when operated, has the effect of short-circuiting the diode. The switching unit 30 is caused to switch at a frequency of about 220 Hz (that is, about equal to the frequency of rotation of the turbine) by an oscillator 31, or by signals supplied on line 32 in synchronism with the turbine rotation from a suitable pick-off (not shown). The switching unit 30 is normally inoperative, when the system is providing an averaged temperature signal, and is operative under control of a selector 33 when the peak temperature signal is desired.

Figure 4:
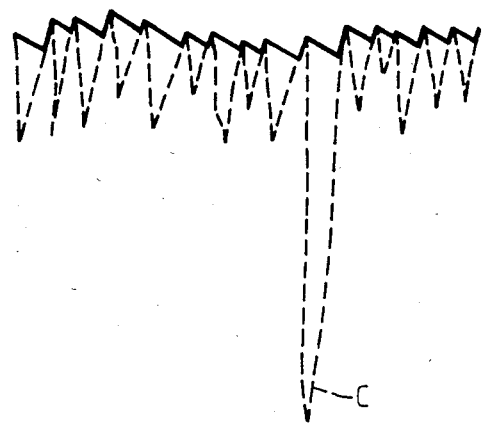
FIG. 4 shows a signal produced by the system.

In its normal, averaged temperature mode, the inverted signals on line 22 are supplied to charge the capacitor 24 during the high-amplitude parts of each pulse, in the manner shown in FIG. 4. During the low-amplitude or negative-going part of each pulse, the capacitor 24 gradually discharges through the resistor 25; the diode 23 in effect isolates the capacitor 24 from the inverter 21 thereby preventing the charge on the capacitor immediately reverting to the low-amplitude value. The value of the resistor 25 is selected such that the time constant is long enough to prevent the capacitor discharging significantly during the low amplitude part of the blade pulses B, and during the noise pulses C. The resultant signal is therefore a relatively constant signal which is further smoothed and reinverted by the processing unit 26 before being supplied to the display unit 27 to give an indication of an averaged blade temperature that is approximately equal to the lowest temperature of the blades. It will be appreciated that this may be scaled as necessary to give the desired mean value.

When an indication of the highest temperature of any blade is required, the selector 33 is actuated to operate the switching unit 30. This causes the diode 23 to be short-circuited for periods of about 50 μs at a frequency of 220 Hz, as shown by the pulses in FIG. 6A. During the periods in which the diode 23 is short-circuited, the capacitor 24 is able to follow the signal on line 22 (shown in FIG. 6B) and so its charge can be reduced, for example, to that of the lowest-amplitude/highest-temperature part of the signal if the switching happens to take place at that time. As soon as the switching unit 30 is opened again to bring the diode 23 into circuit, the charge on the capacitor reverts to its usual value by following the high-amplitude portion of the inverted signal. The output supplied to the processing unit 26 therefore consists, as shown in FIG. 6C, of a high-amplitude signal interrupted periodically by low-amplitude/high temperature spikes S at a frequency of 220 Hz, that is, about equal to the turbine rotational speed. The time for which the diode 23 is short-circuited is approximately equal to the time of passage of an individual blade of the turbine. Because the rate is not precisely equal to the rotational speed of the turbine, the sampling occurs progressively at different blades each revolution. The peaks S will not always be of the same value, since the sampling is made during different parts of the inverted signal. The spiked signal is supplied to the processing unit 26 where it is inverted (shown in FIG. 6D) and fed into a storage device 28 such as a capacitor network. The storage device 28 is charged by the incoming spikes and allowed to decay with a time constant of about 100 ms. As a result, the charge on the storage device 28 will only be altered when the spike exceeds the charge on the storage device, so that, in general, low-amplitude signals will have no effect, while the high-amplitude signals (equivalent to the hottest temperatures) will increase the charge on the storage device, as shown in FIG. 6E. The processing unit 26 then smooths the output of the storage device 28 and uses the resultant signal to provide an output to the display unit 27 respresentative of peak temperature.

If a signal synchronised to turbine blade rotation is available, this may be supplied to the switching unit 30 on line 32 so that the diode 23 in only short-circuited when the pyrometer is aligned with a selected blade, a different blade being selected during each sample to ensure that all the blades are sampled in the shortest time.

Since the system of the present invention is capable therefore of providing signals representative of average turbine blade temperature, and of the peak temperature, this enables any anomalous heating of individual blades readily to be detected.

Instead of an inverting system, as described above, a non-inverting system with a negative peak detector could be used.

What we claim is:

1. A pyrometer system comprising: a radiation pyrometer that provides output signals in accordance with received radiation, a detection circuit connected to receive the output signals of the pyrometer, the detection circuit including capacitor means, means for progressively discharging said capacitor means, inverter that inverts the output of the pyrometer, unidirectional current means connected intermediate said inverter means and said capacitor means to allow passage of positive-going signals to said capacitor means to charge the capacitor means whereby a first signal is provided to a utilization means switching means connected across said unidirectional current means, and means for closing said switching means so as to short-circuit said unidirectional current means at predetermined times to provide a second signal to said utilization means.

2. A pyrometer system according to claim 1, wherein said detection circuit includes oscillator means, and means coupling said oscillator means to control operation of said switching means.

3. A pyrometer system comprising: a radiation pyrometer that provides output signals that alternate between low value and high value in accordance with received radiation at low temperature and high temperature; a detection circuit including inverter means that inverts said output signals from the pyrometer so that low temperature radiation produces high value signals, unidirectional current means connected intermediate said inverter means and a capacitor means to allow passage of positive-going portions of the inverted output signals to charge said capacitor means, resistor means connected across said capacitor means for gradually discharging said capacitor means during negative-going portions of the inverted output signals so that the voltage across the capacitor means forms a first signal which is substantially representative of an average of the low temperature radiation signals, switching means connected across said unidirectional current means, means for closing said switching means at predetermined times so as to short-circuit said unidirectional current means thereby allowing passage of negative-going portion, of said inverted output signals to said capacitor means such that the voltage across said capacitor means follows substantially the output of the pyrometer and forms a second signal, and means supplying the voltage across the capacitor when connected to said inverter means via said unidirectional current means as a first signal to utilization means, and as a second signal to said utilization means at other times.

4. A pyrometer system according to claim 3, for monitoring blades of a gas-turbine engine, wherein the time constant of the capacitor means and resistor means is longer than the duration of the low value part of the output signals from the blades.

5. A pyrometer system according to claim 3, for monitoring blades of a gas-turbine engine, wherein the predetermined times at which said second signals are produced occur at approximately the rotational frequency of the turbine blades.

6. A pyrometer system according to claim 5, wherein the predetermined times at which said second signals are produced occur at a frequency slightly different from the rotational frequency of the turbine blades such that said second signals are produced in respect of different blades each revolution.

7. A pyrometer system according to claim 1 or 3, wherein said detection circuit includes store means, means supplying said second signal to said store means, and means progressively discharging said store means over a time period greater than the intervals between said predetermined times so that an output of said store means to said utilization means is substantially representative of peak temperature.

8. A pyrometer system for monitoring blades of a gas-turbine engine, comprising: a radiation pyrometer that provides output signals that alternate between a low value and a high value as cool and hot regions of the blades pass within a field of view of the pyrometer; a detection circuit including inverter means that inverts the output signals from said pyrometer so that low temperature radiation produces high value signals and high temperature radiation produces low value signals, diode means connected with said inverter means such as to allow passage of only positive-going signals, capacitor means connected to said diode means, so that the voltage on the capacitor means is substantially representative of the low temperature signals from the cool regions of the blades, resistor means connected across said capacitor means, the values of said capacitor means and said resistor means being selected so that the discharge time of said capacitor means is substantially longer than the interval between passage of adjacent blades within the field of view of the pyrometer, switching means connected across said diode means, means for closing the switching means at approximately the rotational frequency of the turbine blades so as to short-circuit said diode means thereby allowing passage of negative-going signals to said capacitor means such that the charge on said capacitor means follows substantially the output of the pyrometer, means inverting the output of said capacitor means, store means, means supplying the inverted output of said capacitor means to charge said store means, wherein the charge on said store means progressively discharges over a time period greater than the intervals between which said diode means is short-circuited so that the output of said store means is substantially representative of high temperature value output in respect of hot regions of said blades.

* * * * *